Sept. 23, 1941.  F. SCHUSTER  2,257,025
RUBBER-FACED ROLLER
Filed July 31, 1937
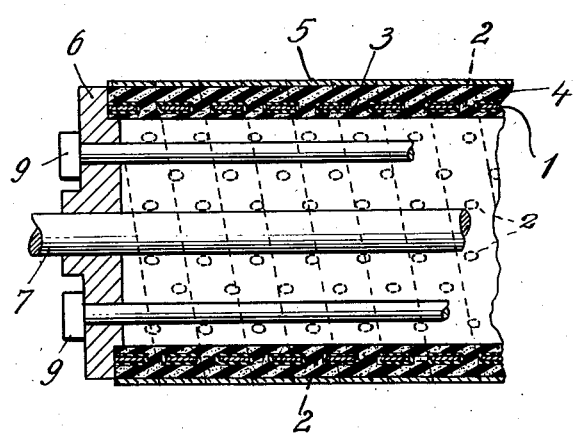
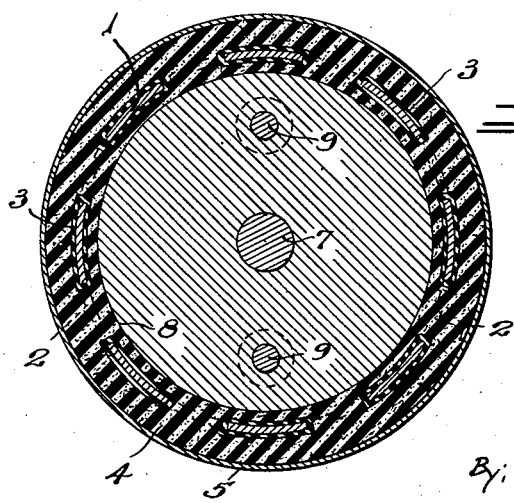

Patented Sept. 23, 1941

2,257,025

UNITED STATES PATENT OFFICE 2,257,025

RUBBER-FACED ROLLER

Fritz Schuster, Chemnitz, Germany

Application July 31, 1937, Serial No. 156,797
In Germany July 15, 1936

5 Claims. (Cl. 68—277)

This invention relates to rollers having an outer facing of rubber. The rollers produced according to the invention are intended primarily for the treatment of textile articles, although they are in no way limited thereto.

For certain purposes, such as the treatment of textile or other comparatively sensitive articles, it has been found very convenient to employ rollers having a facing of sponge or expanded rubber, but the primary objection associated with rollers at the present time having a facing composed of comparatively soft rubber, or even rubber at all, resides in the fact that the soft rubber facing will not properly adhere to a metallic or like base or support and after a short time will tend to become detached or at least to slip on the metallic support, with the result that during rolling operations, when a certain pressure is exceeded, the rubber facing will acquire folds or creases. This is a considerable disadvantage in the roller treatment of comparatively sensitive articles, such as textile products or the like, as if, for example, the rollers are being employed for finishing or like treatments these creases or folds in the rubber facing will produce blotches and discolorations on the finished article, rendering the latter unsalable. Moreover it is quite impossible to apply a facing of soft rubber to a metallic support, and it is the usual practice first to apply to the metallic support a layer of hard rubber, and then onto the layer of hard rubber the outer soft facing, or in certain cases it may even be necessary to employ a still further intermediate layer of medium hardness. Apart from the fact that this method considerably complicates the manufacture with consequent increase in the cost of production, there still exists the same objection that even the hard layer of rubber becomes detached from the metallic support after a short period of use.

It is accordingly the primary object of the invention to provide a roller of the type in question having a facing composed of sponge or expanded rubber mounted on a suitable support consisting for example of metal, wherein the rubber facing will properly adhere to the support even after a considerable period of use.

A further object is to provide a rubber faced roller of this description which is simple in design and can be readily produced at little expense.

Other objects and advantages of the invention will become apparent as the description proceeds.

According to the present invention a perforated sheet metal cylinder is immersed in a rubber solution so as to obtain a thin layer of rubber on the cylinder on all sides. After the immersion the solvent evaporates, and a layer of rubber remains. The rubber is deposited not only on the outer and inner faces of the metallic cylinder but also about the edges of the apertures, so that there are no exposed points of the metallic cylinder.

After the evaporation of the solvent the sheet or sheets of sponge or expanded rubber are placed about the cylinder and the seam or seams is or are closed by a rubber solution. The sponge or expanded rubber is thereupon enclosed by a suitable bandage composed of linen or the like, which is wound about the same, and the structure thus formed is subjected to vulcanisation. Under the action of the heat the thin layer of rubber on the metallic cylinder and at the seam is vulcanised and at the same time it unites with the layer of sponge or expanded rubber. Since, as stated above, the thin layer of rubber encloses the metallic cylinder on all sides, the sponge or expanded rubber at the points of location of the apertures in the cylinder will be secured to the latter in an encompassing fashion by the thin layer of rubber.

The invention will now be described more fully with reference to the accompany drawing.

In the drawing:

Fig. 1 is a longitudinal sectional view of the roller without a core.

Fig. 2 is a transverse sectional view of the roller showing a core arranged therein.

1 is the sheet metal cylinder or support which is furnished with suitable apertures 2 distributed over the periphery. This perforated sheet metal cylinder is immersed in a rubber solution, so that there will be deposited thereon a layer of rubber 3. As clearly shown, this layer of rubber also encompasses the edges of the apertures, so that the metal of the cylinder is not exposed at any point.

About the metallic cylinder thus coated there are then placed the sheets of sponge or expanded rubber 4, which are firmly held by a bandage 5 composed of linen or the like. The structure thus produced is vulcanised and the layer of rubber 3 caused to unite with the layer of sponge rubber 4.

It will be apparent that in this way the sponge rubber is firmly united with the sheet metal cylinder 1, the layer 3 encompassing the sections between any two apertures in the cylinder and by reason of the firm connection with the sponge rubber securely holding the latter on the cylinder.

After the vulcanisation and removal of the bandage 5 the cylinder 1 bearing the rubber facing 3, 4 is assembled in the usual fashion by means of end plates 6 secured thereto in convenient manner, the whole being mounted on the shaft 7. The cylinder may be hollow or if desired there may also be provided an inner core as indicated at 8 in Fig. 2, which may be secured to the end plates 6 by means of bolts 9. In certain circumstances it may also be desirable to locate the core in position within the cylinder or support before the application and vulcanisation of the rubber. During the vulcanisation the rubber will then expand inwards through the apertures 2 until it fills out the entire space intermediate of the jacket 1 and the core 8, resulting in a very firm structure.

It will be obvious that in the manner described a rubber faced roller is obtained in which the facing is entirely precluded from being detached from or slipping on the support, and that moreover when the facing has ultimately become worn a new facing may readily be applied with little trouble.

It will also be understood that no restriction is made to the specific form of embodiment described in the above, and that numerous modifications are quite possible without departing from the spirit of the invention.

What I claim as new and desire to secure by Letters Patent is:

1. A roller for the treatment of textile materials comprising in combination, a metal cylinder having apertures therein distributed over the periphery thereof, a coating of rubber covering the outer and inner peripheries of the cylinder, said coating extending through said apertures and engaging the edges of the metal providing said apertures, a layer of sponge rubber arranged over the surface of said rubber coating and secured thereto, and said sponge rubber extending into said apertures and united with the rubber coating therein.

2. A roller for the treatment of textile materials comprising in combination, a metal cylinder having apertures therein distributed over the periphery thereof, a layer of compact rubber covering the outer and inner peripheries of the cylinder, said compact rubber extending through said apertures and engaging the edges of the metal without filling the apertures, a layer of sponge rubber arranged over the outer surface of said compact rubber layer and extending through the apertures and united to all surfaces of the compact rubber layer.

3. A roller for the treatment of textile materials comprising in combination, a metal cylinder having apertures therein distributed over the periphery thereof, a layer of compact rubber covering the outer and inner peripheries of the cylinder, said compact rubber extending through said apertures and engaging the edges of the metal without filling the apertures, sheets of sponge rubber arranged over the outer surfaces of said rubber layer having the edges thereof secured to each other and the inner faces secured to the compact rubber layer.

4. A roller for the treatment of textile materials comprising in combination, a hollow perforated metal support, a core arranged within said support and having a diameter smaller than the inner diameter of said support, a layer of compact rubber covering both faces of said support and extending through the perforations to engage the edges thereof without closing the perforations, a layer of sponge rubber covering said compact rubber layer on the outer face of the support and extending through the perforations and filling the space intermediate the layer carried by the inner face of the support and the core, and said sponge rubber being united with the compact rubber layer.

5. A roller for the treatment of textile materials comprising in combination, a hollow perforated metal support, a layer of compact rubber covering both faces of said support and extending through the perforations thereof to engage the metal providing the edges of the perforations without closing the same, a layer of sponge rubber covering the outer face of the compact rubber layer and extending through the perforations and covering the inner face of the rubber layer, and said sponge rubber being homogeneously united to the compact rubber along the faces thereof and along the edges thereof within the perforations.

FRITZ SCHUSTER.